United States Patent [19]

Chittofrati et al.

[11] Patent Number: 5,294,248
[45] Date of Patent: Mar. 15, 1994

[54] POLISHES FOR METAL SURFACES CONTAINING CATIONIC EMULSIFIERS, AND CATIONIC EMULSIFIERS CONTAINED THEREIN

[75] Inventors: Alba Chittofrati; Viviana Boselli, both of Milan; Giovanni Gavazzi, Cassano d'Adda; Ezio Strepparola, Treviglio; Renato Spiti, Sesto San Giovanni; Silvia Tresoldi, Cornate d'Adda, all of Italy

[73] Assignee: Ausimont S.p.A., Milan, Italy

[21] Appl. No.: 20,144

[22] Filed: Feb. 19, 1993

[30] Foreign Application Priority Data

Feb. 20, 1992 [IT] Italy .................. MI 92A 000360

[51] Int. Cl.$^5$ ..................... C09G 1/04; C09G 1/12
[52] U.S. Cl. ............................ 106/10; 106/11; 524/278; 524/279; 524/380; 524/463; 524/544
[58] Field of Search ............... 106/10, 2, 11; 252/355, 252/357, 171, 174.21, 174.16, DIG. 17; 524/278, 279, 380, 463, 544

[56] References Cited

U.S. PATENT DOCUMENTS

| | | | |
|---|---|---|---|
| 3,665,041 | 5/1972 | Sianesi et al. | 260/615 A |
| 4,269,739 | 5/1981 | Grejsner | 106/18 |
| 4,273,584 | 6/1981 | D'Angelo et al. | 106/3 |
| 4,398,953 | 8/1983 | van der Linde | 106/10 |
| 4,523,039 | 6/1985 | Lagow et al. | 568/615 |
| 4,729,849 | 3/1988 | Hisamoto et al. | 252/355 |
| 4,785,067 | 11/1988 | Brumbill | 528/26 |
| 4,889,939 | 12/1989 | Caporiccio et al. | 549/13 |
| 5,085,695 | 2/1992 | Randen et al. | 106/10 |

FOREIGN PATENT DOCUMENTS 0148482  7/1985  European Pat. Off. .
64-38480  2/1989  Japan .

OTHER PUBLICATIONS

J. Am. Chem. Soc. 1985, 107, 1197–1201, D. F. Persico et al., "Synthesis of Perfluoropolyethers via Hydrocarbon Polyesters: A New General Method".

*Primary Examiner*—Mark L. Bell
*Assistant Examiner*—C. M. Bonner
*Attorney, Agent, or Firm*—Bryan Cave

[57] ABSTRACT

Polishes for metal surfaces, based on dispersions of waxes, fluorinated polymers and perfluoropolyoxyalkylene oils acquire high gloss characteristics combined with improved water-repellency and resistance to soiling of 0.1–5% by weight of at least a cationic emulsifier comprised in the general formula $$R-L-Q^+X^-_t \qquad (I)$$

where:
R = a chain of perfluoropolyoxyalkylene units;
L = a divalent organic group;
Q = a polar group;
X = a halogen, or a group of formula $$CH_3\text{-Phenylene-}SO_3^-$$

$$R''SO_3-$$

R'' = F$-(CF_2)_m-$;
t = 1 or 2;
m = 1–4.

The polished containing the emulsifiers of formula (I) as well as the compounds comprised in said formula are claimed as new products.

7 Claims, No Drawings

POLISHES FOR METAL SURFACES CONTAINING CATIONIC EMULSIFIERS, AND CATIONIC EMULSIFIERS CONTAINED THEREIN

The present invention relates to polishes for metal surfaces, based on fluorinated polymers, waxes and organic solvents.

In the art there are known polishes based on said ingredients, in the form of liquid emulsions and dispersions, or in paste.

Generally, such polishes are useful to impart to the substrates, onto which they are applied, at least one of the following properties:
high and long-lasting gloss
water-repellency
resistance to soiling
resistance to washings, also with detergents
easy application.

Preparations of silicone-based polishes are described for example in U.S. Pat. Nos. 4,273,584; 4,785,067 and 4,398,953.

Generally it is difficult to obtain, in a single polish, a good combination of all the above-mentioned properties.

Japanese patent application 64-38480 describes compositions endowed with good characteristics of water-repellency and resistance to soiling, and comprising, besides waxes and silicone oils, a combination of low molecular weight polytetrafluoroethylene and of perfluoropolyoxyalkylene.

It has now been found by the Applicant that the use of cationic emulsifiers having perfluoropolyoxyalkylene structure improves the aggregate characteristics of polishes based on dispersions of waxes with fluorinated materials. In particular, such emulsifiers permit to obtain polishes capable of imparting high gloss combined with high water-repellency, resistance to soiling and to washings as well as easy application and polishing to the substrates, onto which they are applied.

In particular, the abovesaid emulsifiers possess a perfluoropolyoxyalkylene chain containing at least a cationic polar group and have general formula $$R[L-Q^+-X^-]_t \quad (I)$$

in which:
R is a chain of perfluorooxyalkylene units, having an average molecular weight ranging from 400 to 2,000, but preferably from 500 to 1,000;
L is a divalent organic group preferably having one of the following formulas:

—CH$_2$O—CO—CH$_2$—

—CH$_2$O(CH$_2$CH$_2$O)$_n$CH$_2$CH$_2$—

—CH$_2$O(CH$_2$CH$_2$O)$_n$COCH$_2$—

—CO—NR'(CH$_2$)$_n$—CH$_2$— t=1 or 2;
n=an integer from 1 to 3, extremes included;
R'=hydrogen, or an alkyl group having 1 to 4 carbon atoms;
Q is a polar organic group comprising N or P atoms as positive charge carriers, and having the formula:

(II)

A$^+$ =a N or P atom;
R$_1$, R$_2$ and R$_3$, like or different from one another, are alkyl groups containing from 1 to 12 carbon atoms, or, when A$^+$ is P, R$_1$, R$_2$, R$_3$ can also be aryl groups; or Q is an aromatic or aliphatic ring, either saturated or unsaturated, containing N or P atoms as positive charge carrier directly bound to group L, wherein such ring can optionally contain alkyl substituents and other heteroatoms such as O and S. Examples of such rings are given by pyridine, methylmorpholine, quinuclidine and alkylphosphacyclohexanes.

X$^-$ =anion, preferably halogen, acetate or a group of formula $$CH_3\text{-Phenylene-}SO_3^- \quad (III)$$

or $$R''SO_3^- \quad (IV)$$

R''=a group of formula F—(CF$_2$)$_m$—
m=a number from 1 to 4, extremes included.

In such formula (I), perfluoropolyoxyalkylene chain R is composed of perfluorooxyalkylene units statistically distributed along the chain and having at least one of the following structures:

(—CF$_2$O—); (—CFO—); (—CF$_2$CF$_2$O—);
               |
              CF$_3$ (—CFCF$_2$O—); (—CF$_2$—CFO—);
  |                |
 CF$_3$            CF$_3$ (—CF$_2$CF$_2$CF$_2$O—);

In particular, perfluoropolyoxyalkylene chain R can have one of the following structures:

$$RfO(CF_2-CFO)_n(CFO)_m(CF_2O)_pR'f— \quad 1)$$
$$\phantom{RfO(CF_2-}|\phantom{O)_n(}|$$
$$\phantom{RfO(CF_2-}CF_3\phantom{)_n(}CF_3$$

where Rf is an alkyl group C$_1$-C$_3$, either thoroughly fluorinated or containing also an atom of hydrogen or chlorine besides fluorine; R'f— is a —CF$_2$— group or

—CF—
|
CF$_3$ group, and m, n, p are such numbers as to impart to R a molecular weight in the abovesaid range;

RfO(CF$_2$CF$_2$O)$_n$(CF$_2$O)$_m$R'f—
where, when t=1, Rf is —CF$_3$, —C$_2$F$_5$, while when t=2,
Rf is=R'f;
R'f is a —CF$_2$— group; m, n have such values as to satisfy the abovesaid molecular weight condition;

$$RfO(CF_2CF_2O)_n(CF_2O)_m(CFO)_p(CF_2-CFO)_q-R'f- \quad 3)$$
$$\underset{CF_3}{|} \qquad \underset{CF_3}{|}$$

where Rf and R'f have the same significance as in the preceding structure (1);

m, n, p, q are such numbers as to satisfy the abovesaid molecular weight conditions;

$$RfO-(CFCF_2O)_n-R'f- \quad 4)$$
$$\underset{CF_3}{|}$$

where Rf is $-C_3F_7$; R'f is a $$-CF-$$
$$\underset{CF_3}{|}$$

group and n has such a value as to satisfy the abovesaid molecular weight conditions;

5) $RfO(CF_2CF_2O)_nR'f-$ where Rf is $-CF_3$, $-C_2F_5$; R'f is a $-CF_2$ group, and n has such a value as to satisfy the abovesaid molecular weight conditions;

6) $RfO(CF_2CF_2CF_2O)_nR'f-$ where Rf is $-CF_3$, $-C_2F_5$; R'f is a $-CF_2CF_2-$ group, and n has such a value as to satisfy the abovesaid molecular weight conditions.

Thus, it is an object of the present invention to provide polishes for metal surfaces, based on dispersions, in organic solvents, of waxes in combination with fluorinated materials selected from the addition polymers of fluoroolefins such as tetrafluoroethylene, chlorotrifluoroethylene and vinylidene fluoride, and the perfluoropolyoxyalkylene oils, and combinations thereof, which polishes contain at least an emulsifier of the cationic type, comprised in the above-illustrated formula (I).

Preferred polishes according to the invention are the ones which comprise, in percent by weight:

organic solvent: 50-90;
waxes: 1-10;
perfluoropolyoxyalkylene oil: 0.1-5 and preferably 0.5-3;
polymer obtained from a fluoroolefin: 0.5-20 and preferably 1.5-20;
cationic emulsifier of formula (I): 0.1-5.

Such polishes can also comprise from 0 to 10% by weight of silicones, from 0 to 20% by weight of an aliphatic alcohol and from 0 to 20% by weight of an abrasive material.

In such compositions, the presence of silicones, in the abovesaid ranges, is preferred when a more easily applicable polish is to be obtained.

As solvents for the polishes of the invention it is possible to use saturated and straight paraffin hydrocarbons containing from 9 to 12 carbon atoms; isoparaffins, such as for example the products commercially known as Isopar (produced by Exxon Corp.); white spirits, such as for example Shellsol (produced by Shell Co.) and Exxsol (produced by Exxon Corp.); burning oil; terpenes such as for example D-limonene; naphtha; aromatic hydrocarbons such as toluene, xylene and the like, as well as volatile silicones, such as for example cyclic silicones (cyclomethicones).

Utilizable waxes are, for example, vegetable waxes (c arnauba was, rice wax, etc.), animal waxes (for example beeswax), mineral waxes (ceresine, Montan wax), petroleum waxes (Hungarian paraffin) and microcrystalline and synthetic waxes.

The perfluoropolyoxyalkylene oils which are contained in the polishes of the invention are products known in the art. They are compounds composed of chains comprising perfluoropolyoxyalkylene units having at least one of the following structures:

$$(-CF_2O); \quad (-CFO-); \quad (-CF_2CF_2O-);$$
$$\qquad\qquad \underset{CF_3}{|}$$

$$(-CF-CF_2O-) \quad (-CF_2CFO-);$$
$$\underset{CF_3}{|} \qquad\qquad \underset{CF_3}{|}$$

$$(-CF_2CF_2CF_2O-);$$

In particular, such perfluoropolyoxyalkylenes exhibit an average molecular weight ranging from 400 to 6,000, viscosities ranging from 1 to 1,000 cSt, and preferably from 20 to 250 cSt, and they belong to one or more of classes 1) to 6) described hereinbefore to define chain R of the cationic emulsifiers of formula (I), with the exception that in each of such classes Rf and R'f are perfluoroalkyl groups either like or different from each other, containing from 1 to 3 carbon atoms, depending on the class which they belong to.

The perfluoropolyoxyalkylene oils of class (1) are commercially known under the tradenames Fomblin ® Y or Galden ®, while the ones of class (2) are known under the tradename Fomblin ® Z; all said oils are produced by Montedison.

The perfluoropolyoxyalkylene oils of class (3) are prepared in accordance with what is disclosed in U.S. Pat. No. 3,665,041; those of class (4) are known under the tradename Krytox ® and are produced by Du Pont; those of class (5) are described in U.S. Pat. No. 4,523,039 and in J. Am. Chem. Soc. 1985, 107, 1197-1201; those of class (6) are described in European patent application No. 148,482.

Under the designation "fluoroolefin polymers", whenever used herein, there are comprised both the homopolymers of the above-mentioned monomers, and the copolymers of such monomers with minor amounts of other fluorinated monomers, such as for example hexafluoropropene, perfluoroalkylvinylethers and the like. The abovesaid polymers have an average molecular weight ranging from 1,000 to 500,000. They can be prepared by any known method, such as for example the polymerization of the gaseous monomers in an aqueous medium or in solvents, or by irradiating, with γ rays or with electron beams, polymers of higher molecular weight, or, lastly, by thermal degradation of the latter.

Examples of utilizable fluoroolefin polymers are represented by the commercial products Algoflon L ® and Polymist ® produced by company Ausimont; AG Lube ® produced by company Asahi Glass; Vydax ® and Teflon MP ® produced by company Du Pont; Lubron ® produced by company Daikin; Hostaflon Ceridust ® produced by company Hoechst; SST ® produced by company Shambrock; Fluon ® and Whitcon TL ® produced by company ICI, and in general by the low molecular weight polymers utilized in inks and paints.

Among the silicones which are optionally utilizable in the polishes of the invention, the following can be cited: polydialkysiloxanes, and preferably the polydimethylsiloxanes having a viscosity ranging from 2 to 500 cSt, such as the products of the series Dow-Corning 200 Fluid; the organofunctional silicones, in particular the aminofunctional silicones and the hydroxyfunctional silicones, and the silicone resins in general.

Utilizable alcohols are the straight or branched aliphatic alcohols, containing from 1 to 5 carbon atoms. Primary or secondary alcohols containing 2 or 3 carbon atoms are preferably used.

Examples of abrasives are aluminum silicates, aluminium oxides, kieselguhr.

A further object of the present invention are the compounds of formula:

  (I)

in which R, L, Q, X, t have the significance defined hereinbefore, which are utilized as emulsifiers for the polishes of the invention, as already mentioned herein.

Such compounds are preparable according to the following methods:

1) When group L is a $-CH_2O-CO-CH_2-$, the starting material utilized is a perfluoropolyoxyalkylene of formula $R-CH_2OH$, where R is a perfluoropolyoxyalkylene chain as already defined herein for general formula (I). Such perfluoropolyoxyalkylene is a product known in the art. It is reacted by means of known esterification techniques with an acid of formula $XCH_2COOH$, in which X is a halogen or a group of formula (III) or (IV), thereby obtaining an ester of formula

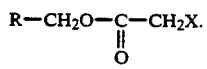

Such ester is then subjected to quaternization reaction with a tertiary base, such as a trialkylamine, or a trialkyl phosphine or triaryl phosphine, or in an alcoholic solvent, so obtaining the desired product in solution, or in a hydrocarbon solvent, wherefore the product precipitates as a salt.

2) When group L is a $-CH_2O(CH_2CH_2O)_nCH_2CH_2-$ group, it is started from the compound $RCH_2O(CH_2CH_2O)_nCH_2CH_2OH$ (prepared by ethoxylation, according to known methods, of perfluoropolyoxyalkylene $RCH_2OH$ with an ethylene oxide) by reacting it with $SOCl_2$ in order to obtain the compound $RCH_2O(CH_2CH_2O)_nCH_2CH_2Cl$, which is then quaternized with the previously mentioned tertiary base.

3) When group L is a $-CH_2O(CH_2CH_2O)_nCOCH_2-$ group it is possible to operate as in the preceding case (1), causing the esterification to occur with the $XCH_2COOH$ acid of the ethoxylated compound of formula $RCH_2(OCH_2CH_2)_nOH$ (where R has the significance indicated at point (1)) obtained by ethoxylation of perfluoropolyoxyalkylene $RCH_2OH$ with ethylene oxide in an alkaline medium.

4) When group L is a $-CO-NR'(CH_2)_n-CH_2-$ group, it is possible to start from an ester of formula $RCOOCH_3-$. Such ester is a product known in the technique. It can be reacted according to known techniques with a base of formula $HNR'-(CH_2)_n-CH_2NR_1R_2$. Subsequently, such intermediate can be reacted with an alkylating agent such as, for example, an alkyl halogenide, thereby obtaining the quaternization of the aminic nitrogen atom contained therein.

The polishes object of the present invention are utilizable for cleaning, polishing and protecting substrates, in particular the metal surfaces, either or not painted, of cars, airplanes, coaches and the like, in order to impart them a high resistance to water and to soiling, a high gloss and resistance to washing also with detergents and also a protection against corrosion, along with a very easy application.

The following examples are given to illustrate the present invention and are not to be considered as a limitation thereof.

The polishes of the examples are prepared as follows.

In a glass vessel there are mixed the solvent and one or more waxes in a fixed weight ratio, and heating is conducted until melting of the wax.

Such mixture is introduced, while it is hot, into a second vessel, which contains further solvent and (if it is utilized) a silicone component, and which is kept under stirring.

The resulting mixture (base) is cooled to room temperature and then the other ingredients are added thereto. Among these ingredients, the perfluoropolyoxyalkylene oil is preferably added first, maintaining the base under high-speed stirring (for example by means of a Silverson laboratory stirrer), whereafter the cationic emulsifier, either as such or in an alcohol solution, is added.

The anhydrous fluoroolefin polymer in the form of powder is then added, and it is followed by a further silicone component (if it is utilized) in an alcoholic solution. Lastly, if necessary, the abrasive material is added.

An alternative method to the use of the fluoroolefin polymer in powder is the method which utilizes a dispersion of the polymer in a perfluoropolyosyalkylene oil among the ones cited hereinbefore, or in a volatile chlorofluorocarbon, such as for example Freon ® or Delifrene ®. In the former case, the amount of perfluoropolyoxyalkylene oil utilized for such dispersion can replace in whole or in part the initial addition of such oil. In the latter case, the chlorofluorocarbon can be evaporated from the final composition.

When the addition of the various ingredients is completed, the resulting composition is maintained under stirring for a few minutes.

The polishes of the invention do not exhibit sedimentation of the components even after months. Their stability in the time is confirmed by their resistance to centrifugation, wherefore no separation of the components takes place when the polishes are subjected to centrifugation at 500 r.p.m. for 10 minutes.

Even if, operating at 1,000 r.p.m., a separation of the components should occur after 10 minutes, it would be possible to obtain again a homogeneous dispersion by means of a simple manual agitation.

The characteristics of the polishes according to the examples have been determined by treating standard panels with constant amounts of said polishes (0.7 g for each panel) either immediately after application or after 1-10 washing cycles with a commercial shampoo (Supershampoo Arexons) and subsequent drying.

The panel utilized for the test were painted with a paint for cars, white or blue (depending on the test), and had the following dimensions: 30×30 cm. The white panels were used for water-repellency and resistance to carbon black adhesion tests, while the blue panels were utilized for gloss measurements.

In order to permit a direct comparison between a treated panel and an untreated panel, each panel was divided into two identical parts by means of an adhesive masking tape, so that the untreated part was utilized as a check.

For each type of test, a new clean panel was washed with Supershampoo Arexons, was rinsed with water and was dried. The polish to be tested was applied onto the panel by means of a clean piece of cotton wool and was let completely dry in 10 minutes.

The characteristics of easy application and rub out after drying were subjectively determined on the basis of the comparison between conventional polishes and fluorinated polishes.

The water-repellency characteristics were defined by the time, in seconds, necessary for a water jet to flow away from the panel sloping at 30°.

In such tests, operating with high-quality non-fluorinated polishes of the commercial type, times of 10 seconds are generally determined, while times of less than 5 seconds are considered as good and times of 1-2 seconds are considered as excellent (U.S. Pat. No. 4,273,584).

The resistance-to-soiling characteristics were determined by applying carbon black powder onto the treated surface of the panel and by heating the panel to 70° C. for 3 hours.

Then the panel was shaken to remove the powder excess, and a piece of soft paper was passed over the panel, whereafter the resistance to soiling was evaluated as follows:

excellent, when the carbon black powder could be easily removed without exerting any pressure;
good, when the powder could be removed by exerting only a slight pressure on the surface;
fair, when it was necessary to exert a higher pressure on the surface;
poor, when a permanent grey halo remained on the surface even exerting a strong pressure.

The cycle was then repeated on the same treated panel, after washings with shampoo for cars.

Repeated cyclic thermal treatments with carbon black on the same panel represent extremely drastic conditions.

The gloss characteristics were determined by means of a Micro Tri Gloss glossmeter produced by Byk Gardner.

The panel gloss values reported in the examples are the average of nine measurements carried out near the corners and in the middle of the panel. For this determination, blue-painted panels were utilized, operating at an angle of 20°. The untreated surfaces of the panel were compared after application and rub out of the polishes also after ten washings with Supershampoo Arexons.

EXAMPLE 1

Preparation of polish 1A (comparative)

In a suitable vessel, 2.93 g of carnauba wax, 1.46 g of ceresine and 8.78 g of white spirit were mixed.

The mixture was heated until melting of the waxes.

In a second vessel, 0.8 g of silicone oil DC 200/20 ® (produced by Dow Corning) were mixed with 59.98 g of white spirit Shellsol ® (produced by Shell); the mixture was stirred by means of a high-speed Silverson ® stirrer, whereafter the hot mixture of waxes in white spirit, previously prepared, was added thereto.

The resulting mixture (base (I)) was then additioned, at room temperature and under stirring, with 0.25 g of silicone resin Z 6018 ® (produced by Dow Corning) dissolved in 0.75 g of isopropyl alcohol, and then, in the order, with 15.05 g of isopropyl alcohol and with 10 g of Sillitin N ® (abrasive). The dispersion was then maintained under stirring until complete incorporation of the abrasive. It exhibited the following composition, expressed in per cent by weight:

| Carnauba wax | 2.93 |
| Ceresine | 1.46 |
| White spirit | 68.76 |
| Silicone oil DC 200/20 | 0.8 |
| Silicone resin Z 6018 | 0.25 |
| Isopropyl alcohol | 15.80 |
| Sillitin N | 10.0 |

Preparation of polish 1B (comparative)

73.95 g of basic composition (I) prepared for polish 1A were additioned, at room temperature and under stirring, with 1.5 g of perfluoropolyoxyalkylene oil of class (1) (Fomblin Y04) having a viscosity of 40 cSt, and then, in the order, with 3.31 g of tetrafluoroethylene-/hexafluoropropene copolymer having an average molecular weight equal to 350,000 (prepared by treating with γ rays of 12.5 MRad a higher molecular weight copolymer), with 0.25 g of silicone resin Z 6018 dissolved in 0.75 g of isopropanol, with 10.24 g of isopropanol and, lastly, with 10 g of Sillitin N (abrasive).

The mixture was maintained under stirring until complete incorporation of the abrasive. The mixture had the following composition expressed in per cent by weight:

| Carnauba wax | 2.93 |
| Ceresine | 1.46 |
| White spirit | 68.76 |
| DC 200/20 | 0.8 |
| Silicone resin Z 6018 | 1.25 |
| Isopropanol | 10.99 |
| Sillitin N | 10.0 |
| Fomblin Y04 | 1.5 |
| Tetrafluoroethylene copolymer | 3.31 |

Preparation of polish 1C (according to the invention)

In this preparation, a cationic emulsifier was utilized, which exhibited the formula:

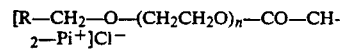

in which:
Pi = pyridine;
R = perfluoropolyoxyalkylene chain having the structure of class (1) and an average molecular weight = 700;
n = 1.5.

73.95 g of base (I) prepared for polish 1A were additioned, under stirring, with 1.5 g of the same perfluoropolyoxyalkylene oil utilized for polish 1B, and then, in the order, with 0.77 g of the above-described cationic emulsifier, dissolved in 9.47 g of isopropanol, then with 3.31 g of the tetrafluoroethylene copolymer utilized for polish 1B, with 0.25 g of silicone resin Z 6018 dissolved in 0.75 g of isopropanol, and lastly with 10 g of abrasive Sillitin N, maintaining the resulting mixture under stirring until complete incorporation of the abrasive.

The resulting dispersion had the following composition, expressed in per cent by weight:

| | |
|---|---|
| Carnauba wax | 2.93 |
| Ceresine | 1.46 |
| White spirit | 68.76 |
| Silicone oil DC 200/20 | 0.8 |
| Silicone resin Z 6018 | 1.25 |
| Isopropanol | 10.22 |
| Sillitin N | 10.00 |
| Fomblin Y04 | 1.5 |
| Tetrafluoroethylene copolymer | 3.31 |
| Cationic emulsifier | 0.77 |

Preparation of polish 1D (according to the invention)

It was operated as is described for polish 1C, with the only exception that the cationic emulsifier utilized had the formula:

$$[R-(CH_2O(CH_2CH_2O)_n-CO-CH_2-N^+(CH_2CH_3)_3]Cl^-$$

where:
R has the same significance as in the cationic emulsifier utilized in polish 1C,
n = 1.5.

Preparation of polish 1E (comparative)

It was operated as is described for polish 1C, with the only exception that instead of the cationic emulsifier, there was used an equal amount by weight of a fluorinated cationic emulsifier of formula:

$$RCF_2COO^-H_3N^+-(CH_2)_{17}-CH_3$$

wherein R has the same significance as in the cationic emulsifier utilized in polish 1C.

The present emulsifier can be considered as a mixture of a fluorinated cationic emulsifier with a non-fluorinated hydrocarbon cationic emulsifier.

Preparation of polish 1F (comparative)

73.95 g of base (I) obtained in the preparation 1A were additioned, under stirring, with 0.77 g of the cationic emulsifier of preparation 1C, dissolved in 14.28 g of isopropanol, and then, in the order, with 0.25 g of silicone resin Z 6018 dissolved in 0.75 g of isopropanol, and with 10 g of Sillitin N, maintaining the mixture under stirring until total incorporation of the abrasive.

The resulting polish differs from polishes 1C and 1D for the absence of the tetrafluoroethylene copolymer and of the perfluoropolyoxyalkylene oil, and furthermore, with respect to polish 1E, for the presence of the cationic emulsifier, instead of the anionic emulsifier.

With respect to polish 1A, it differs only for isopropanol content (15.03% instead of 15.8%) and for the presence of the cationic emulsifier.

The characteristics of the polishes of the present example are reported in the following Table I.

TABLE I

| | Composition | | | | | |
|---|---|---|---|---|---|---|
| | 1A | 1B | 1C | 1D | 1E | 1F |
| Water-repellency | | | | | | |
| just after treatment | excellent | excellent | excellent | excellent | excellent | good |
| after 1 washing | good | good | excellent | excellent | good | good |
| after 3 washings | good | good | good | good | good | poor |
| after 5 washings | poor | good | good | good | fairly | poor |
| after 10 washings | poor | poor | fair good | good | good fair good | poor |
| Gloss at 20° | | | | | | |
| before treatment | 29,6 | 33,3 | 38,2 | 42,1 | 33,4 | 33,3 |
| immediately after treatment | 55,2 | 56,2 | 57,5 | 60,4 | 56,4 | 55,0 |
| Gloss retention (*) before/after treatment (%) | 86,5 | 68,9 | 50,5 | 43,5 | 69 | 65,2 |
| after 1 washing | 55,6 | 58,4 | 59,5 | 63,2 | 58,9 | 55,4 |
| after 3 washings | 55,1 | 59,1 | 59,3 | 63,5 | 59,6 | 55,4 |
| after 5 washings | 56,0 | 59,0 | 59,6 | 64,2 | 60 | 56,2 |
| after 10 washings | 57,7 | 59,5 | 59,3 | 64,6 | 60,2 | 58,2 |
| Gloss retention (**) before/after 10 washings (%) | 91 | 87,4 | 91,5 | 81,3 | 85,8 | 87,1 |
| Resistance to soiling (carbon black test) | | | | | | |
| immediately after treatment | poor | poor | excellent | excellent | good | fair good |
| after 1 washing | | | excellent | excellent | fair good | fair good |
| after 3 washings | | | good | good | poor | poor |
| after 5 washings | | | fair good | good | | |
| after 10 washings | | | poor | poor | | |

(*) Retention % = gloss after treatment − initial gloss/initial gloss
(**) Retention % = gloss after treatment − initial gloss/gloss after 10 washings − initial gloss

EXAMPLE 2

Preparation of polish 2A (comparative)

73.3 g of base (I) utilized in polish 1A were additioned, under stirring, with 1.52 g of the same perfluoropolyoxyalkylene oil (Fomblin Y04) used for polish 1B, and then, in the order, with 0.78 g of a commercial cationic emulsifier, as defined hereinafter, dispersed in 11.8 g of isopropanol, then with 2.5 g of the same tetrafluoroethylene/hexafluoropropene copolymer used in polish 1B, and lastly with 10.1 g of Sillitin N, and the mixture was stirred until total incorporation of the abrasive.

The cationic emulsifier used herein is a quaternary alkyl ammonium salt bound through a non-fluorinated organic group to a perfluoroalkyl chain $CF_3(CF_2)_a^-$. Such emulsifier is marketed under the designation Forofac 1179 by Atochem and it can be commonly utilized as an emulsifier both in the solid form and in alcoholic solution (or dispersion).

The dispersion so prepared exhibits the following composition in percent by weight:

| | |
|---|---|
| Carnauba wax | 2.9 |
| Ceresine | 1.44 |
| White spirit | 66.16 |

-continued

| Silicone oil DC 200/20 | 0.8 |
| Isopropanol | 11.80 |
| Sillitin N | 10.10 |
| Fomblin Y04 | 1.52 |
| Tetrafluoroethylene copolymer | 2.50 |
| Cationic emulsifier | 0.78 |

Preparation of polish 2B (comparative)

The preceding preparation 2A was repeated, with the only exception that a different cationic emulsifier, marketed under the trade designation Surflon S-121, produced by Asahi Glass Co., was used. Said emulsifier is a quaternary ammonium salt bound, through a non-fluorinated organic group, to a perfluoroalkyl chain $CF_3(CF_2)_n-$.

Preparation of polish 2C (comparative)

Preparation 2A was repeated with the only exception that, as an emulsifier, an anionic emulsifier of formula:

$$R-CF_2COO^-NH_4^+$$

was utilized, wherein R is a perfluoropolyoxyalkylene chain similar to the one existing in the cationic emulsifier of polish 1C.

Preparation of polish 2D (comparative)

Preparation 2A was repeated with the only exception that an anionic emulsifier of formula:

$$R-CF_2COO^-H_2N^+(C_2H_5OH)_2$$

was utilized, wherein R is a perfluoropolyoxyalkylene chain similar to the one of the cationic emulsifier of polish 1C.

Preparation of polish 2E (according to the invention)

Preparation 2A was repeated with the exception that the utilized emulsifier was a cationic emulsifier analogous with the one used in polish 1C.

The characteristics of the polishes so prepared are reported in the following Table II.

TABLE II

| | Composition | | | | |
|---|---|---|---|---|---|
| | 2A | 2B | 2C | 2D | 2E |
| Water-repellency | | | | | |
| just after treatment | excellent | excellent | excellent | excellent | excellent |
| after 1 washing | good | excellent | excellent | good | excellent |
| after 3 washings | fairly good | good | good | good | good |
| after 5 washings | fair good | good | good | good | good |
| after 10 washings | fair good | poor | fair good | fair good | fair good |
| Gloss at 20° | | | | | |
| before treatment | 34,3 | 36,8 | 41,7 | 38,7 | 42,9 |
| after treatment | 55,5 | 49,8 | 55,2 | 49,7 | 59,8 |
| gloss retention before/after treatment (%) | 61,8 | 35,3 | 32,3 | 28,4 | 39,4 |
| after 1 washing | 56,5 | 49,2 | 56,2 | 50,7 | 59,6 |
| after 3 washings | 56,7 | 50,7 | 56,5 | 52,9 | 60,0 |
| after 5 washings | 57,3 | 51,7 | 57,6 | 52,6 | 60,3 |
| after 10 washings | 57,1 | 50,9 | 57,7 | 52,9 | 60,9 |
| gloss retention after treatment/after 10 washings (%) | 93 | 92,2 | 84,4 | 77,5 | 94 |
| Resistance to soiling (test with carbon black) | | | | | |
| immediately after | poor | poor | poor | poor | good |

TABLE II-continued

| | Composition | | | | |
|---|---|---|---|---|---|
| | 2A | 2B | 2C | 2D | 2E |
| treatment | | | | | |

EXAMPLE 3

In this example, the characteristics of polishes according to the invention and not according to the invention, having different fluorinated component contents are compared.

Preparation of polish 3A (according to the invention)

Preparation 1C was repeated with the exceptions that the cationic emulsifier content was increased from 0.77% to 1.5% and that the isopropanol content was correspondingly reduced from 10.22% to 9.49%, the amount of the remaining components being identical in both polishes.

Preparation of polish 3B (according to the invention)

Preparation 1C was repeated, but varying the amounts of the components in order to have the following per cent composition:

| Carnauba wax | 1.47 |
| Ceresine | 0.73 |
| White spirit | 68.76 |
| Silicone oil DC 200/20 | 0.8 |
| Silicone resin Z 6018 | 0.25 |
| Isopropanol | 8.83 |
| Sillitin N | 10.0 |
| Fomblin Y 04 | 3.0 |
| Tetrafluoroethylene copolymer | 4.62 |
| Cationic emulsifier | 1.54 |

In the following Table III, the characteristics of polishes 3A and 3B are compared with the characteristics of polishes 1C and 1B.

TABLE III

| | Composition | | | |
|---|---|---|---|---|
| | 1B | 1C | 3A | 3B |
| Water-repellency | | | | |
| just after treatment | excellent | excellent | excellent | excellent |
| after 1 washing | good | excellent | excellent | excellent |
| after 3 washing | good | good | good | excellent |
| after 5 washing | good | good | good | excellent |
| after 10 washing | poor | fairly good | good | excellent |
| Gloss at 20° | | | | |
| before treatment | 33,3 | 38,2 | 40 | 35,1 |
| after treatment | 56,2 | 57,5 | 56 | 61,3 |
| gloss retention before/after treatment (%) | 68,9 | 50,5 | 40 | 74,6 |
| after 1 washing | 58,4 | 59,5 | 59,2 | 66,1 |
| after 3 washings | 59,1 | 59,3 | 58,7 | 65,8 |
| after 5 washings | 59,0 | 59,6 | 59,1 | 66,1 |
| after 10 washings | 59,5 | 59,3 | 59,9 | 66,3 |
| gloss retention after treatment/after 10 washings (%) | 87,4 | 91,5 | 80,4 | 84 |
| Resistance to soiling (test with carbon black) | | | | |
| immediately after treatment | poor | excellent | excellent | excellent |
| after 1 washing | | excellent | excellent | excellent |
| after 3 washings | | good | good | good |
| after 5 washings | | fair | good | good |

We claim:

1. Polishes for metal surfaces, based on dispersions, in organic solvents, of waxes and fluorinated materials selected from fluoroolefin copolymers and perfluoropolyoxyalkylene oils, wherein said polishes comprise a cationic emulsifier of general formula:

$$R[-L-Q^+X^-]_t \qquad (I)$$

where:
R is a chain of perfluorooxyalkylene units containing from 1 to 3 carbon atoms, having an average molecular weight ranging from 400 to 2,000;
L is a divalent organic group;
t = 1 or 2;
Q = a polar organic group comprising N or P atoms as positive charge carriers, and having formula:

$$-A^+ \begin{matrix} R_1 \\ -R_2 \\ R_3 \end{matrix} \qquad (II)$$

$A^+$ = a N or P atom; $R_1$, $R_2$, $R_3$, like or different from one another, are alkyl groups containing from 1 to 12 carbon atoms, or, when $A^+$ is P, they can be also aryl groups, or Q is an aromatic or aliphatic ring, either saturated or unsaturated, containing N or P atoms as positive charge carrier directly bound to the L group, in which such ring can optionally contain alkyl substituents and other heteroatoms selected from O and S;

$X^-$ = anion.

2. The polishes of claim 1, wherein L in formula I is selected from:

$-CH_2O-CO-CH_2-$ $-CH_2O(CH_2CH_2O)_nCH_2CH_2-$ $-CH_2O(CH_2CH_2O)_nCOCH_2-$ or, $-CO-NR'(CH_2)_n-CH_2-$ wherein:
n = a number from 1 to 3, extremes included;
R' = hydrogen, or an alkyl group with 1-4 carbon atoms.

3. The polishes of claim 1, wherein $X^-$ in formula I is selected from: halogen; acetate; $CH_3$-phenylene-$SO_3^-$; or $R''SO_3^-$, wherein $R''=F(CF_2)m-$, m=1-4.

4. The polishes of claim 1 comprising, in per cent by weight:

| | |
|---|---|
| Organic solvent | 50-90 |
| Perfluoropolyoxyalkylene oil | 0.1-5 |
| Fluoroolefin polymer | 0.5-20 |
| Wax | 1-10 |
| Cationic emulsifier | 0.1-5 |

5. The polishes of claim 4 comprising furthermore 0-10% by weight of an aliphatic alcohol, 0-10% by weight of silicones and 0-20% by weight of an abrasive material.

6. The polishes of claim 1, wherein the perfluoropolyoxyalkylene oil is contained in amounts from 0.5 to 3% by weight.

7. The polishes of claim 1, wherein the fluoroolefin polymer is contained in amounts from 1.5 to 20% by weight. T

* * * * *